United States Patent

Nakagawa et al.

[11] Patent Number: 6,024,774
[45] Date of Patent: Feb. 15, 2000

[54] CHEMICAL REACTION APPARATUS AND METHOD OF COLLECTING MAIN PRODUCT GAS

[75] Inventors: Kazuaki Nakagawa; Hideyuki Ohzu, both of Yokohama; Toshiyuki Ohashi, Kawasaki; Yoshihiro Akasaka, Kawasaki; Norihiro Tomimatsu, Kawasaki, all of Japan

[73] Assignee: Kabushiki Kaisha Toshiba, Kawasaki, Japan

[21] Appl. No.: 08/936,745

[22] Filed: Sep. 25, 1997

[30] Foreign Application Priority Data

Sep. 26, 1996 [JP] Japan .................................. 8-254081

[51] Int. Cl.[7] .................................. C01B 3/24; C10J 1/28; B01D 53/22
[52] U.S. Cl. ........................ 48/198.3; 48/197 R; 48/128; 48/127.3; 95/45; 95/51; 95/115; 422/239
[58] Field of Search ................................ 48/198.3, 127.3, 48/197 R, 128; 423/245.3; 422/238, 239; 502/406; 95/45, 51, 115

[56] References Cited

U.S. PATENT DOCUMENTS

| | | |
|---|---|---|
| 3,031,273 | 4/1962 | Latinen ................................ 422/137 |
| 3,557,011 | 1/1971 | Colombo et al. . |
| 3,847,672 | 11/1974 | Trocciola et al. ........................ 429/46 |
| 5,637,259 | 6/1997 | Galuszka et al. ....................... 252/373 |
| 5,693,210 | 12/1997 | Tomita et al. ........................... 205/324 |

OTHER PUBLICATIONS

A.M. Wolsky et al., "Technologies for $CO_2$–Capture from Advanced Power–Generation Systems", 1993 Summer National AIChE Conference, Seattle, Washington, pp. 1–20, Aug. 15–18, 1993.

Fogler, H. Scott, Elements of Chemical Reaction Engineering, Prentice Hall, Inc., P 163–164, 547–548, 1992.

*Primary Examiner*—Robert J. Warden, Sr.
*Assistant Examiner*—James Kennedy
*Attorney, Agent, or Firm*—Finnegan, Henderson, Farabow, Garrett & Dunner, L.L.P.

[57] ABSTRACT

The chemical reaction apparatus of the present invention can increase the producing rate of the main product gas by effectively removing carbon dioxide from the reaction site, the carbon dioxide generated together with the main product as the raw material gas is made to react at a high temperature of 400° C. The reaction apparatus comprises a reactor for generating a main product gas and a byproduct gas which is carbon dioxide, by making a raw material gas to react, and lithium zirconate granular material placed in the reactor, to react with the byproduct carbon dioxide gas, thereby preparing a carbonate salt.

15 Claims, 2 Drawing Sheets

CHEMICAL REACTION APPARATUS AND METHOD OF COLLECTING MAIN PRODUCT GAS

BACKGROUND OF THE INVENTION

The present invention relates to a chemical reaction apparatus and a method of collecting a main product gas, and more specifically to a chemical reaction apparatus which can enhance the reactivity of a main product gas, by removing carbon dioxide out of the system, while making a raw material gas react to produce the main product gas and carbon dioxide as a byproduct gas, and a method of collecting such a main product gas.

In many of the chemical industrial processes, the reactivity is as low as several tens of percentage due to the limitations of the reactive temperature and the chemical equilibrium. For example, in a chemical process for generating hydrogen and carbon dioxide from a reaction between carbon monoxide and water at a temperature of 400° C. or more, and collecting hydrogen as main product, as carbon dioxide is being eliminated from the reaction site, the chemical equilibrium is shifted to the hydrogen producing side. Consequently, the reactivity of hydrogen is enhanced.

In connection with such a reaction system, studies have been made to selectively separate and remove carbon dioxide. For example, the separation of carbon dioxide generated in a reaction system, with use of a polymer film such as of cellulose acetate or a ceramic film such as of alumina, has been considered.

However, with the polymer film, the temperature of the gas to be processed, is limited to be lower than about 200° C., and therefore it is practically difficult to apply such a film to the reaction system for collecting hydrogen at a temperature of 400° C. or more. In the case of the ceramic film, since the separation rate for carbon dioxide is low, it is difficult to shift the chemical equilibrium effectively to the hydrogen generating side when producing hydrogen and carbon dioxide.

BRIEF SUMMARY OF THE INVENTION

An object of the present invention is to provide a chemical reaction apparatus capable of enhancing the generation rate for the main product gas, by removing carbon dioxide as a byproduct gas out of the reaction system, while generating the main product gas and carbon dioxide by making a raw material gas to react at a high temperature (for example, 400° C. or higher).

Another object of the present invention is to provide a method of collecting a main product gas, the method being capable of enhancing the generation rate for the main product gas, by removing carbon dioxide as a byproduct gas out of the reaction system, while generating the main product gas and carbon dioxide by making a raw material gas to react at a high temperature (for example, 400° C. or higher).

To achieve the above object, the present invention provides a chemical reaction apparatus comprising: a reactor for generating a main product gas and a byproduct gas which is carbon dioxide, by making a raw material gas to react; and a compound placed in the reactor, to react with the byproduct carbon dioxide gas, thereby preparing a carbonate salt.

Further, the present invention provides a method of collecting a main product gas, comprising the steps of: generating a main product gas and a byproduct gas which is carbon dioxide, by making a raw material gas to react; and removing the byproduct carbon dioxide gas out of the reaction site in the form of a carbonate, by making the byproduct carbon dioxide gas react with lithium zirconate.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1:
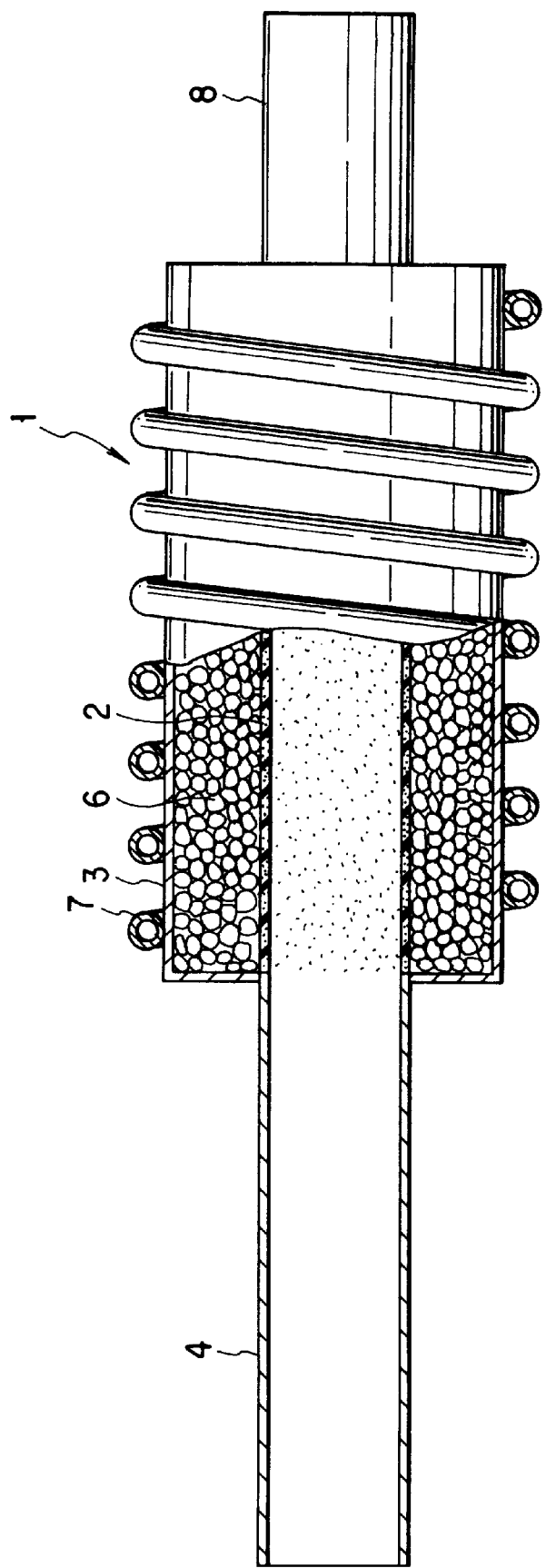
FIG. 1 is a partially cut-out cross sectional view of an embodiment of the reaction apparatus according to the present invention.

A chemical reaction apparatus according to the present invention will now be described with reference to FIG. 1.

A reactor 1 consists of an inner tube 2 in which a raw material gas is introduced, and an outer tube 3 for surrounding the inner tube 2. The inner tube 2 is made of porous ceramics such as porous alumina, which has a carbon dioxide permeability. An introduction tube 4 for introducing the raw material gas to the reactor 1, is connected to one end of the inner tube 2.

The inner tube is filled with reactive catalyst powder 5. A granular compound 6 which give rise to a carbonate when reacting with carbon dioxide, is filled into a space between the inner and outer tubes 2 and 3. A coolant circulation pipe 7 serving as cooling means is wound around the peripheral surface of the outer tube 3. An exhaustion tube 8 is coupled to the other end of the inner tube 2.

Examples of the raw material gas are a mixture of carbon monoxide and water (water vapor), a mixture of methane and water (water vapor), and the like.

The raw material gas consisting of carbon monoxide and water vapor, produces a main product gas, hydrogen and a byproduct gas, carbon dioxide, by the following reaction formula (1). The reaction proceeds at a temperature of 400° C. or higher, and generates heat.

$$CO+H_2O \rightarrow H_2+CO_2 \tag{1}$$

Preferable examples of the reaction catalyst used for the reaction between carbon monoxide and water (vapor) are an iron-based oxide such as iron oxide, or iron-chrome composite oxide. This iron-based oxide activates the reaction at a temperature of 450 to 550° C. The reaction catalyst may be filled into not only the inner tube 2, but also the section of the introduction tube 4, which is close to the inner tube 2.

The raw material gas consisting of methane and water vapor produces a main product gas, hydrogen, and a byproduct gas, carbon dioxide, by the following two-step reaction formulas (2) and (3). The first step reaction proceeds at a temperature of 700 to 800° C., and absorbs heat, and the second step reaction proceeds at a temperature of 400° C. or higher, and generates heat.

$$CH_4 + H_2O \rightarrow 3H_2 + CO \quad (2)$$

$$CO + H_2O \rightarrow H_2 + CO_2 \quad (3)$$

As can be understood from the above formulas, when methane is used as a component of the raw material gas, 4 moles of hydrogen can be generated per 1 mole of methane.

Preferable examples of the reaction catalyst used for the first step reaction are nickel-based catalysts including metal nickel, which activates the reaction at a temperature of 700 to 800° C. Further, preferable examples of the reaction catalyst used for the second step reaction between carbon monoxide and water vapor are iron-based oxides such as iron oxide and iron-chrome composite oxide, as before. When filling such reaction catalysts into the chemical reaction apparatus, it is preferable that the reaction apparatus should be divided into three, namely, the first zone, that is, the section of the introduction tube 4, which is close to the inner tube 2, the second zone, that is, the section of the inner tube 2, which is close to the introduction tube 4, and the third zone, that is, the section of the inner tube 2, which is further than the second zone. Then, the reaction catalyst for the first step reaction is filled into the first zone, a mixture of the catalysts for the first and second step reactions into the second zone, and the reaction catalyst for the second step reaction into the third zone.

An example of the compound to be filled into the space between the inner and outer tubes 2 and 3 is lithium zirconate. As indicated by the reaction formula (4) below, lithium zirconate reacts with carbon dioxide at a temperature of 450 to 650° C. to produce lithium carbonate and zirconia. In other words, lithium zirconate produces lithium carbonate and zirconia, while reacting with carbon dioxide at a temperature close to the reaction temperature for carbon monoxide and water in the formula (1).

$$Li_2ZrO_3(s) + CO_2(g) \rightarrow ZrO_2(s) + Li_2CO_3(l) \quad (4)$$

Zirconia and lithium carbonate thus produced react with each other at a temperature of 780° C. or higher under an atmospheric pressure, or 700° C. or higher under 0.6 atm or lower, to reproduce lithium zirconate while releasing carbon dioxide, as indicated by the following reaction formula (5).

$$ZrO_2(s) + Li_2CO_3(l) \rightarrow Li_2ZrO_3(s) + CO_2(g) \quad (5)$$

It is preferable that the lithium zirconate used here should be in the form of grain so as to have a large specific area, such that it can react with carbon dioxide at high efficiency. It is further preferable that the average grain diameter should be, for example, 2.0 $\mu$m or less. Alternatively, the lithium zirconate may be used in the form of sheet. Such a lithium zirconate sheet is prepared by, for example, the following method. That is, first, lithium zirconate is wet-blended with a binder such as polyvinyl butyral, together with a solvent such as methylethyl ketone or dibutyl phthalate, to prepare slurry. Then, the slurry is developed on a film, thus forming a sheet material having a thickness of 0.5 to 2 mm. After that, the sheet material is heated by an electric furnace at a temperature of 500 to 700° C. in the atmosphere so as to degrease the material, thus obtaining a lithium zirconate sheet.

The inner tube 2 serves to separate the reaction catalyst powder 5 filled in the tube 2 and the granular compound 6 (of lithium zirconate) filled in the outer tube 3 from each other. It is preferable that the inner tube 2 should be made of a porous ceramic tube such as a porous alumina tube having a porosity of 50 to 80%. Or the inner tube may be made of a net material of a heat-resisting metal. When the reactor 1 is made to have a double-tube structure including the inner and outer tubes 2 and 3, the reaction catalyst powder and the granular material such as of lithium zirconate can be easily replaced, thus facilitating the maintenance of the operation.

It is preferable that the inner tube 2 should be made lengthy in the direction of the flow of the raw material gas, in order to have a sufficient reaction time for the material gas.

The outer tube 3, the introduction tube 4 and the exhaustion tube 8 are made of dense ceramics such as dense alumina, nickel, iron or the like.

It is preferable that the outer tube 3 should be made lengthy in the direction of the flow of the raw material gas, in order to enhance the reactivity between the granular compound 6 filled inside the tube, and the byproduct, carbon dioxide, produced by the reaction.

The space defined between the inner and outer tubes 2 and 3 should preferably have a volume sufficient for the granular compound 6 filled in the space and the carbon dioxide byproduct generated, to fully react with each other.

The coolant circulation pipe 7, that is, cooling means serves to control the temperature of the reaction site such that it does not exceed the suitable temperature for the above reactions between carbon monoxide and water, and lithium zirconate, since these reactions are of heat-generating type. It should be noted here that the cooling means is not limited to the circulation pipe, but a fin tube, that is, a spiral coolant circulation tube equipped with a plurality of disk-like fins piercing through them, may be arranged in the inner tube 2.

Next, the method of collecting a main product gas, according to the present invention, will now be described with reference to FIG. 1. The following description will be made in connection with an example where a mixture of carbon monoxide gas and water vapor, is used as a raw material gas.

First, powder 5 of an iron oxide-based catalyst, that is, the reaction catalyst for the material gas, is filled into the inner tube 2 of the reactor 1. Then, a granular material 6 of a compound (lithium zirconate), which produces a carbonate as it reacts with carbon dioxide, is filled into the space between the inner and outer tubes 2 and 3.

Subsequently, carbon monoxide and water vapor, preheated to 400° C. or more, preferably 450 to 550° C. are introduced to the inner tube 2 via the introduction tube 4. At this stage, due to the reaction promoting effect of the reaction catalyst powder 5, the main product gas, hydrogen and the byproduct gas, carbon dioxide are produced mainly in the inner tube 2 as expressed by the above reaction formula (1). The byproduct gas, carbon dioxide, thus produced is introduced from the inner tube 2 made of porous ceramics, into the space between the inner and outer tubes 2 and 3. In this space, the byproduct carbon dioxide is brought into contact with the lithium zirconate granular material 6, and reacts with it to produce a lithium carbonate as expressed by the reaction formula (4), which is further eliminated from the reaction site. Since the reactions expressed by the formulas (1) and (4) take place at close temperatures of 450 to 550° C., carbon dioxide is separated and removed from the production site of hydrogen and carbon dioxide. It should be noted that the reactions of the formulas (1) and (4) both generate heat, and therefore the temperature of each reaction site is controlled to a respective temperature of 450 to 550° C. by supplying a coolant to the coolant circulation pipe 7 arranged around the circumferential surface of the outer tube 3.

As described above, with use of lithium zirconate, which is a compound to a carbonate as it reacts with carbon dioxide, it is possible to remove carbon dioxide from the reaction site at a high temperature of 450 to 550° C., at which hydrogen and carbon dioxide are produced. Consequently, the generation of hydrogen and carbon dioxide, and the separation and removal of carbon dioxide can be carried out both in the reaction site. Therefore, the chemical equilibrium of the reaction formula (1) shifts to the right side, thus making it possible to increase the producing rate of hydrogen. More specifically, in the reaction formula (1), when either one of the produced gases on the right side is eliminated from the reaction site, the generation of hydrogen or carbon dioxide can be promoted. As the chemical equilibrium shifts to the right side by the elimination, the producing rate of hydrogen is enhanced. In the present invention, one of the production gases, that is, carbon dioxide, is separated and removed by making it react with the lithium zirconate granular material 6. Therefore, the producing rate (generation efficiency) of hydrogen can be enhanced, and at the same time, highly pure hydrogen can be obtained.

The gas containing hydrogen, produced by the reactor 1 is collected via the exhaustion tube 8.

If lithium zirconate is entirely converted into zirconia as shown in the reaction formula (4) during the step of removing carbon dioxide from the reaction site in the form of lithium carbonate, generated by the reaction of the raw material gas due to the lithium zirconate granular material 6 filled in the space between the inner and outer tubes 2 and 3, it becomes difficult to reduce the concentration of carbon dioxide at the reaction site. It should noted, however, that the reaction between lithium zirconate and carbon dioxide is a reversible type as indicated by the formulas (4) and (5). Therefore, when zirconia and lithium carbonate are heated to a temperature higher than the reaction temperature of the reaction formula (4), (that is, 780° C. or higher at atmospheric pressure, for example), carbon dioxide is released as indicated by the formula (5), thus making it possible to reproduce lithium zirconate.

Figure 2:
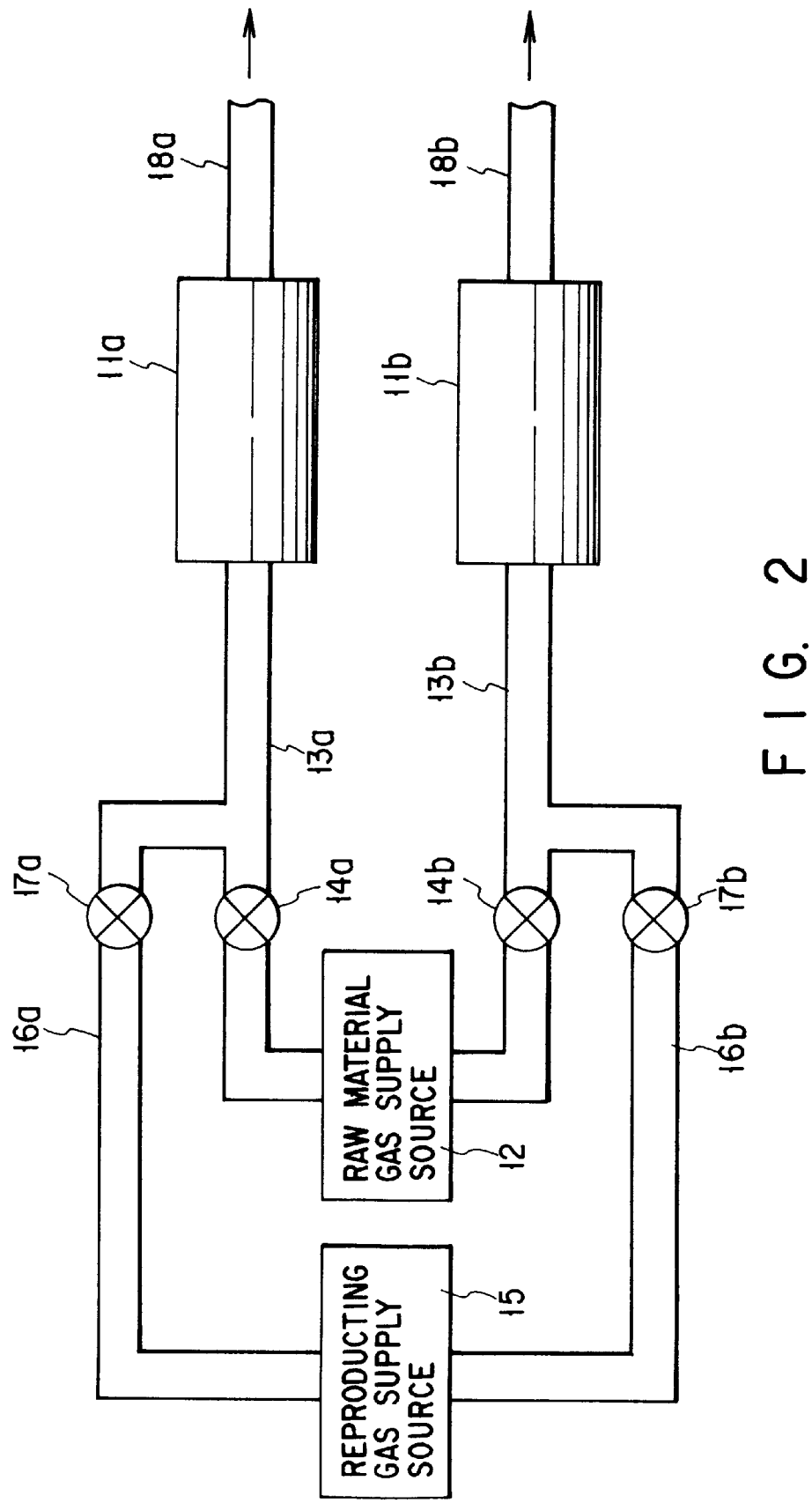
FIG. 2 is a perspective view of another embodiment of the reaction apparatus according to the present invention.

Further, by utilizing the above-described characteristics of lithium zirconate, the following operation is possible. That is, a plurality of reactors are prepared, and the generation of hydrogen and carbon dioxide, and the separation and removal of carbon dioxide with lithium zirconate are assigned to some of the reactors, while the reproduction of lithium zirconia is assigned to the other reactors. When these operations are carried out alternately, it becomes possible to collect highly pure hydrogen almost continuously. The following are descriptions of the above technique in more detail with regard to the reaction apparatus having two reactors, as shown in FIG. 2.

First and second reactors 11a and 11b are arranged to be parallel with each other. These reactors 11a and 11b each have a structure similar to that of the before-described reactor 1 shown in FIG. 1. A raw material gas supply source 12 is connected to each of one ends of the reactors 11a and 11b via first and second introduction tubes 13a and 13b. Further, first and second raw gas valves 14a and 14b are provided for the first and second introduction tubes 13a and 13b, respectively.

A reproducing gas supply source 15 is connected to each of the first and second introduction tubes 13a and 13b via the first and second supply tubes 16a and 16b. Further, an end portion of the first supply tube 16a, which is on the first introduction tube 13a side, is connected to a portion of the first introduction tube 13a, which is located between the reactor 11a and the first raw material gas valve 14a. An end portion of the second supply tube 13b, which is on the second introduction tube 13b side, is connected to a portion of the second introduction tube 16b, which is located between the reactor 11b and the second raw material gas valve 14b. First and second reproducing gas valves 17a and 17b are provided for the first and second supply tubes 16a and 16b, respectively. The first and second exhaustion tubes 18a and 18b are connected to the other end portions of the respective reactors 11a and 11b.

Next, the method of collecting a main product gas, with use of the reaction apparatus shown in FIG. 2 will now be described. The description will be made in connection with an example case where the raw material gas is a mixture of carbon monoxide and water vapor.

First, the powder of iron-oxide-based catalyst, which is a reaction catalyst for the raw material gas, is filled into the inner tubes (not shown) of the reactors 11a and 11b. Then, the granular material of a compound (for example, lithium zirconate), which produces a carbonate when reacts with carbon dioxide, is filled into the space between the inner and outer tubes of each reactor 11a and 11b.

Subsequently, the first raw material gas valve 14a is opened, and the second raw material gas valve 14b are closed, thus the first reactor 11a is selected as the reaction site for the raw material gas. After that, a mixture of carbon monoxide and water vapor, heated up to 400° C. or more, preferably 450 to 550° C. in advance, is introduced from the raw material gas supply source 12 to the inner tube of the first reactor 11a via the first introduction tube 13a. In this step, due to the reaction promoting effect of the reaction catalyst powder filled into the inner tube, a main product gas, hydrogen, and a byproduct gas, carbon dioxide are generated by the reaction indicated by the formula (1) mainly in the inner tube. The byproduct gas, carbon dioxide, thus generated is introduced to the space between the inner and outer tubes from the inner tube which is made of porous ceramics, and it is brought into contact with the granular material of lithium zirconate filled in the space. Thus, carbon dioxide is converted into a lithium carbonate by the reaction expressed by the formula (4), and in the form of lithium carbonate, it is removed from the reaction site. Since the reactions expressed by the formulas (1) and (4) take place at close temperatures of 450 to 550° C., carbon dioxide can be separated and removed in the site of generating hydrogen and carbon dioxide. Consequently, the producing rate (production efficiency) of hydrogen can be enhanced, and at the same time, highly pure hydrogen can be collected via the first exhaustion pipe 18a. It should be noted that the reactions expressed by the formula (1) and (4) both generate heat, and therefore coolant is supplied to the coolant circulation pipe (not shown) arranged on the circumferential surface of the outer tube of the reactor 11a, so as to control the temperature of each reaction site to an appropriate temperature of 450 to 550° C.

In the above-described step of separating and removing carbon dioxide generated by the reaction of the raw material gas, lithium zirconate is entirely converted into zirconia. When such a conversion occurs, the first material gas valve 14a is closed, and the second material gas valve 14b is opened, and thus the reaction site for the material gas is switched from the first reactor 11a to the second reactor 11b.

It should be noted that the switching of the reactors 11a and 11b is carried out in the following manner. That is, the concentration of carbon dioxide in the gas exhuasted from the exhaust tube (e.g., the first exhaustion tube 18a) connected to the reactor (e.g., the first reactor 11a) is detected by a sensor (not shown), and when the detected carbon dioxide concentration becomes a predetermined level, the reactor is switched.

Subsequently, a mixture of carbon monoxide preheated to 400° C. or more, preferably 450 to 550° C. is introduced to the inner tube of the second reactor 11b from the raw material gas supply source 12, via the second introduction tube 13b, and highly pure hydrogen is collected via the second exhaustion tube 18b as in the case of the first reactor 11a.

While collecting highly pure hydrogen by the second reactor 11b, the first reproducing gas valve 17a provided in the first supply tube 16a is opened, and the second reproducing gas valve 17b provided in the second supply tube 16b bis closed. Then, the reproducing gas having a temperature higher than the reaction temperature of carbon dioxide, is introduced into the inner tube of the first reactor 11a from the reproducing gas supply source 15 via the first supply tube 16a and the first introduction tube 13a. In this step, zirconia and lithium carbonate in the reactor 11a may be heated by means of heating gas such as combustion gas, or a heating device. During this period, the heated reproducing gas is introduced to the space between the inner and outer tubes from the inner tube made of porous ceramics, and therefore zirconia and lithium carbonate generated in the space by the reaction expressed by the formula (5) are heated. As a result, as expressed by the formula (5), carbon dioxide is generated and at the same time, lithium zirconate is reproduced. The carbon dioxide gas thus generated is discharged via the first exhaustion tube 18a.

The reproducing gas is a carrier gas used for discarding carbon dioxide generated in the reactor via the exhaustion tube, and the type of the reproducing gas is not particularly limited except for carbon dioxide gas. Further, in the reproduction of lithium zirconate, the supply of the reproducing gas is not essential. However, when the concentration of carbon dioxide in the reactor increases, the rate of the reaction expressed by the formula (5) slows down, and it becomes necessary to set the reaction temperature higher, for example, no less than 780° C. Therefore, in order to reproduce lithium zirconate at low temperature, it is preferable that a reproducing gas should be supplied into the reactor as described above. In more detail, when the flow amount of the reproducing gas is set such that the partial pressure of carbon dioxide in the reactor is 0.6 atm or less, lithium zirconate can be reproduced at a temperature of about 700° C.

As described, when, for example, two reactors 11a and 11b are prepared, one of them for the generation of hydrogen and carbon dioxide, and the separation and removal of carbon dioxide with lithium zirconate, and the other for the reproduction of lithium zirconate, and these operations are carried out alternately, it is possible to collect highly pure hydrogen almost continuously.

Preferable examples of the present invention will now be described in detail with reference to FIG. 1.

EXAMPLE 1

In the reactor 1 shown in FIG. 1, the inner tube 2 was formed of a porous alumina tube having a porosity of about 60%. The inner tube 2 had an outer diameter of 3.5 cm, an inner diameter of 3 cm and a length of 160 cm. The outer tube 3 was formed of a dense alumina tube, having an outer diameter of 7 cm, an inner diameter of 5 cm and a length of 160 cm.

1400 g of alumina grains having an average grain diameter of 10 $\mu$m, which carries about 10 weight % of iron oxide ($Fe_3O_4$) is filled into the inner tube 2 of the reactor 1, so as to form a catalyst layer having a porosity of 70%. Further, 2700 g of lithium zirconate grains having an average grain diameter of 1 $\mu$m, is filled between the inner tube 2 and the outer tube 3, so as to form a lithium zirconia grain layer having a porosity of 50%.

Subsequently, $H_2O$ and CO, which make a raw material gas, were mixed together at a ratio of $H_2O/CO=2$. The raw material gas was heated in advance to 450° C., and then introduced to the inner tube 2 of the reactor 1 via the introduction tube 4 at a rate of 1 L/min. At the same time, a coolant was supplied into the coolant circulation pipe 7 arranged on the circumferential surface of the outer tube 3, such as to control the temperature of each reaction site of the catalyst layer and lithium zirconia grain layer at an appropriate temperature, that is, 450° C.

In the step of supplying the raw material gas to the reactor 1, the concentration of CO in the gas exhausted from the exhaustion tube 8 was measured, and the consumption rate of CO by the reaction of the material gas in the reactor 1 (that is, the reaction efficiency of the material gas) was obtained. The result was as shown in Table 1 below.

EXAMPLE 2

The raw material gas was introduced into the inner tube 2 of the reactor 1 via the introduction tube 4 at a rate of 1 L/min. in a similar manner to that of Example 1 except that the material gas was heated in advance to 500° C.

In the step of supplying the raw material gas to the reactor 1, the concentration of CO in the gas exhausted from the exhaustion tube 8 was measured, and the consumption rate of CO by the reaction of the material gas in the reactor 1 was obtained. The result was as shown in Table 1 below.

EXAMPLE 3

The raw material gas was introduced into the inner tube 2 of the reactor 1 via the introduction tube 4 at a rate of 1 L/min. in a similar manner to that of Example 1 except that the material gas was obtained by mixing $H_2O$ and CO at a ratio of $H_2O/CO=3$.

In the step of supplying the raw material gas to the reactor 1, the concentration of CO in the gas exhausted from the exhaustion tube 8 was measured, and the consumption rate of CO by the reaction of the material gas in the reactor 1 was obtained. The result was as shown in Table 1 below.

COMPARATIVE EXAMPLE 1

The raw material gas was introduced into the inner tube 2 of the reactor 1 at a rate of 1 L/min in a similar manner to that of Example 1 except that a reactor whose space between the inner and outer tubes was not filled with lithium zirconate grains, was employed.

In the step of supplying the raw material gas to the reactor 1, the concentration of CO in the gas exhausted from the exhaustion tube 8 was measured, and the consumption rate of CO by the reaction of the material gas in the reactor 1 was obtained. The result was as shown in Table 1 below.

COMPARATIVE EXAMPLE 2

The raw material gas was introduced into the inner tube 2 of the reactor 1 via the introduction tube 4 at a rate of 1 L/min. in a similar manner to that of Example 1 except that a reactor having an SiO$_2$ film having a thickness of 20 μm and serving as a carbon dioxide separating film, formed on the outer surface of the inner tube, was used.

In the step of supplying the raw material gas to the reactor 1, the concentration of CO in the gas exhausted from the exhaustion tube 8 was measured, and the consumption rate of CO by the reaction of the material gas in the reactor 1 was obtained. The result was as shown in Table 1 below.

TABLE 1

| | State of Reactor | Raw Material Gas | Consumption Rate of CO (%) |
|---|---|---|---|
| Example 1 | li$_2$ZrO$_3$ filled between inner and outer tubes | H$_2$O/CO = 2 | 98.1 |
| Example 2 | li$_2$ZrO$_3$ filled between inner and outer tubes | H$_2$O/CO = 2 | 99.0 |
| Example 3 | li$_2$ZrO$_3$ filled between inner and outer tubes | H$_2$O/CO = 2 | 99.2 |
| Comparative Example 1 | li$_2$ZrO$_3$ not filled | H$_2$O/CO = 2 | 69.7 |
| Comparative Example 2 | separation film on outer surface of inner tube | H$_2$O/CO = 2 | 73.4 |

As is clear from Table 1, each of Examples 1 to 3 exhibits a much higher value in the CO consumption rate, that is, the hydrogen generating efficiency in the formula (1), as compared to those of Comparative Examples 1 and 2. This is because in Examples 1 to 3 which employed the reactor shown in FIG. 1, the chemical equilibrium shifted to the right side in the reaction formula (1) as carbon dioxide generated in the reaction site of the raw material gas reacts with lithium zirconate, to be eliminated from the site.

Further, in each of Examples 1 to 3, after the reaction of the raw material gas and the removal of generated carbon dioxide with lithium zirconate, a nitrogen gas serving as a reproducing gas and heated to 700° C. was supplied to the reactor 1 via the introduction tube 4 at a rate of 1 L/min. for two hours. After the completion of the supply of the reproducing gas, the material filled between in the inner and outer tubes was examined, and the most of the material was identified to be lithium zirconate.

EXAMPLE 4

In the reactor 1 shown in FIG. 1, the inner tube 2 was formed of a porous alumina tube having a porosity of about 60%. The inner tube 2 had an outer diameter of 3.5 cm, an inner diameter of 3 cm and a length of 240 cm. The outer tube 3 was formed of a dense alumina tube, having an outer diameter of 7 cm, an inner diameter of 5 cm and a length of 240 cm.

750 g of alumina grains having an average grain diameter of 10 μm, which carries about 20 weight % of nickel is filled into a portion 4 of the introduction tube (outer diameter: 3.5 cm, inner diameter: 3 cm), close to the inner tube 2 of the reactor 1, over a length of 80 cm, so as to form a first catalyst layer having a porosity of 70%. 700 g of catalyst mixture (mixture ratio by weight: 20/80) of alumina grains having an average grain diameter of 10 μm, which carries about 20 weight % of nickel, and other alumina grains having an average grain diameter of 10 μm, which carries about 10 weight % of iron oxide (Fe$_3$O$_4$), is filled into a portion of the inner tube 2, close to the introduction tube 4, over a length of 80 cm, so as to form a second catalyst layer having a porosity of 70%. 1400 g of alumina grains having an average grain diameter of 10 μm, which carries about 10 weight % of iron oxide (Fe$_3$O$_4$), is filled into a portion of the inner tube 2, which is further side to the second catalyst layer, so as to form a third catalyst layer having a porosity of 70%.

Further, 2700 g of lithium zirconate grains having an average grain diameter of 1 μm, is filled between the inner tube 2 and the outer tube 3, so as to form a lithium zirconia grain layer having a porosity of 50%.

Subsequently, H$_2$O and CH$_4$, which make a raw material gas, were mixed together at a ratio of H$_2$O/CH$_4$=4. The raw material gas was heated in advance to 700° C., and then introduced to the inner tube 2 of the reactor 1 via the introduction tube 4 at a rate of 2 L/min. At the same time, the first catalyst layer was heated to 700° C. by a heater (not shown) arranged on the portion 4 of the introduction tube, where the first catalyst layer was situated. Further, a coolant was supplied into the coolant circulation pipe 7 arranged on the circumferential surface of the outer tube 3, such as to control the temperature of each reaction site of the catalyst layer and lithium zirconia grain layer at an appropriate temperature, that is, 450° C.

In the step of supplying the raw material gas to the reactor 1, the concentration of CH$_4$ in the gas exhausted from the exhaustion tube 8 was measured, and the consumption rate of CH$_4$ by the reaction of the material gas in the reactor 1 (that is, the reaction efficiency of the material gas) was obtained. The result indicated that the consumption rate of CH$_4$ was 99%.

COMPARATIVE EXAMPLE 3

The raw material gas having a mixture rate of H$_2$O/CH$_4$=4 was introduced into the reactor having a structure similar to that of Example 4 at a rate of 2 L/min except that the space between the inner and outer tubes was not filled with lithium zirconia grains. Then, the consumption rate of CH$_4$ by the reaction of the material gas in the reactor 1 was obtained. The result indicated that the consumption rate was 90%.

It was, therefore, confirmed that Example 4 exhibited a very much higher hydrogen generating efficiency compared with Comparative Example 3.

Further, in Example 4, after the reaction of the raw material gas and the removal of generated carbon dioxide with lithium zirconate, a nitrogen gas serving as a reproducing gas and heated to 700° C. was supplied to the reactor 1 via the introduction tube 4 at a rate of 1 L/min. for 2 hours. After the completion of the supply of the reproducing gas, the material filled between in the inner and outer tubes was examined, and the most of the material was identified to be lithium zirconate.

As described, the present invention can provide a chemical reaction apparatus capable of enhancing the generation rate for the main product gas overcoming the limitation of the chemical equilibrium, by removing carbon dioxide as a byproduct gas out of the reaction system, while generating the main product gas and carbon dioxide by making a raw material gas to react at a high temperature of, for example, 400° C. or higher.

The present invention can further provide a method of collecting a main product gas, the method being capable of enhancing the generation rate for the main product gas overcoming the limitation of the reaction equilibrium, by removing carbon dioxide as a byproduct gas out of the reaction system, while generating the main product gas and carbon dioxide by making a raw material gas to react at a high temperature of, for example, 400° C. or higher.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

We claim:

1. A chemical reaction apparatus comprising:
   a reactor including an inner tube, for generating a main product gas and a byproduct gas which is carbon dioxide, by making a raw material gas introduced therein to react, and an outer tube surrounding said inner tube, said inner tube having a gas permeability and
   lithium zirconate filled in a space between said inner tube and said outer tube, to react with the by product carbon dioxide gas, thereby producing lithium carbonate and zirconia.

2. The apparatus according to claim 1, wherein said raw material gas produces a main product gas and a byproduct gas, that is, carbon dioxide, by a heat-generating reaction, and the apparatus further comprises cooling means for cooling said reactor.

3. The apparatus according to claim 1, wherein said inner tube is filled further with a reaction catalyst.

4. The apparatus according to claim 1, wherein said lithium zirconate is used in the form of grain.

5. The apparatus according to claim 1, wherein said lithium zirconate is used in sheet form.

6. A chemical reaction apparatus comprising:
   a reactor including an inner tube, for generating a main product gas and a byproduct gas which is carbon dioxide, by making a raw material gas introduced therein to react, and an outer tube surrounding said inner tube, said inner tube having a gas permeability; and
   lithium zirconate filled in a space between said inner tube and said outer tube, to react with the byproduct carbon dioxide gas, thereby producing lithium carbonate and zirconia, wherein a plurality of said reactors are provided, said inner tube in each of said reactors is connected to a raw material gas supply source and a reproducing gas supply source, respectively, said raw material gas supply source and said reproducing gas supply source being switchable,
   said reproducing gas supply source supplies a gas heated up to a temperature higher than a temperature at which carbon dioxide is released from said lithium carbonate and zirconia.

7. The apparatus according to claim 6, wherein said raw material gas produces a main product gas and a byproduct gas, that is, carbon dioxide, by a heat-generating reaction, and the apparatus further comprises cooling means for cooling each of said reactors.

8. The apparatus according to claim 6, wherein said inner tube in each of said reactors is filled further with a reaction catalyst.

9. The apparatus according to claim 6, wherein said lithium zirconate is used in the form of grain.

10. The apparatus according to claim 6, wherein said lithium zirconate is used in the form of sheet.

11. A method of collecting a main product gas, including the steps of:
    generating a main product gas and a byproduct gas which is carbon dioxide, by making a raw material gas to react; and
    removing the byproduct carbon dioxide gas out of a reaction site in the form of a carbonate, by making the byproduct carbon dioxide gas react with lithium zirconate.

12. The method according to claim 11, wherein said raw material gas consists of carbon monoxide and water, and the main product gas and the byproduct gas, generated by the reaction of this raw material gas are hydrogen and carbon dioxide, respectively.

13. The method according to claim 11, wherein said raw material gas consists of methane and water, and the main product gas and the byproduct gas, generated by the reaction of this raw material gas are hydrogen and carbon dioxide, respectively.

14. The method according to claim 11, wherein a produced material from the reaction between the lithium zirconia and carbon dioxide is heated to release carbon dioxide, thereby reproducing lithium zirconia.

15. The method according to claim 14, wherein a reproducing temperature for lithium zirconate is higher than a reaction temperature for said raw material gas.

* * * * *